United States Patent
Tsunoda et al.

(10) Patent No.: US 6,622,928 B2
(45) Date of Patent: Sep. 23, 2003

(54) CONTROL SYSTEM FOR AUTOMOTIVE AIR CONDITIONER

(75) Inventors: Isao Tsunoda, Saitama (JP); Hironori Shuto, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/108,553

(22) Filed: Mar. 29, 2002

(65) Prior Publication Data

US 2002/0139862 A1 Oct. 3, 2002

(30) Foreign Application Priority Data

Mar. 30, 2001 (JP) .................................. 2001-100660

(51) Int. Cl.[7] .............................. F24F 7/00; G05D 23/00
(52) U.S. Cl. .................................... 236/91 C; 236/49.3
(58) Field of Search ............................... 236/49.3, 91 C

(56) References Cited

U.S. PATENT DOCUMENTS

| 5,187,943 A | * | 2/1993 | Taniguchi et al. ............. 62/180 |
| 5,553,661 A | * | 9/1996 | Beyerlein et al. .......... 236/91 C |
| 6,390,380 B2 | * | 5/2002 | Ichishi et al. ............... 236/49.3 |

* cited by examiner

*Primary Examiner*—William Wayner
(74) *Attorney, Agent, or Firm*—Sughrue Mion, PLLC

(57) ABSTRACT

In a control system for an automotive air conditioner, a solar insolation correction coefficient includes two types of values one of which is a value (11L, 11R) expressed by a directly body-transmitted solar insolation component which is a solar insolation directly received by the body of a driver and/or a passenger, whereas the other is a value (12) expressed by a vehicle applied solar insolation component which is a solar insolation received by a vehicle to thereby increase the in-vehicle temperature. Accordingly, the target temperature for conditioned air discharged from the outlets can be set in such a manner as to correspond to the solar insolation which the driver actually receives.

14 Claims, 4 Drawing Sheets

CONTROL SYSTEM FOR AUTOMOTIVE AIR CONDITIONER

BACKGROUND OF THE INVENTION

1. Field of the Invention

The present invention relates to a control system for an automotive air conditioner, and more particularly to a control system for an automotive air conditioner for automatically regulating the temperature of conditioned air discharged from outlets according to solar insolation.

2. Description of the Related Art

In conventional automatically-controlled air conditioners for automobiles, it is a general practice to automatically correct the temperature of conditioned air discharged from outlets according to solar insolation through a solar insolation sensor.

On the other hand, a radiation heat from the sun is transmitted to the driver in two ways: one is a directly body-transmitted solar insolation component which is a solar insolation by sun light directly entering/transmitting from windows of a vehicle to the body of the driver; and the other is a vehicle applied solar insolation component which is a solar insolation transmitted to the body of the driver via air inside a driver/passenger compartment. Heat is mainly applied to the upper half portion of the body of the driver with the directly body-transmitted solar insolation component, and the rate of its heat transfer is largely influenced by the orientation and elevation angle of the sun (refer to FIG. 2). On the other hand, with the vehicle applied solar insolation component heat is applied to the whole body of the driver, and the rate of its heat transmission is not influenced by the orientation of the sun as much as with the directly body-transmitted solar insolation component but is influenced only by the angle of elevation of the sun (refer to FIG. 3). In FIGS. 2 and 3, the location of the sun relative to a left front seat is expressed on the axis of abscissas in which zero degree represents a solar insolation entering from the front forward, −90 degrees a solar insolation entering from leftward relative to the center of the vehicle body, +90 degrees a solar insolation entering from rightward relative to the center of the vehicle body, and 180 degrees a solar insolation entering from rearward. In particular, it is found from the graph in FIG. 2 that the rate of heat transmission reaches its peak by a solar insolation entering from a side window on one's seat side (for example, a driver's seat side) with the sun being located on the one's seat side when the sun is situated at a relatively high position (or at an angle of elevation of 60 degrees) and that the rate of heat transmission reaches its peak by a solar insolation entering from the windscreen with the sun being located on an opposite side to the one's seat (for example, a passenger's seat side) when the sun is situated at a relatively low position (or at an angle of elevation of 30 degrees).

In the prior art, however, the temperature of conditioned air discharged from the outlets has only been corrected/adjusted simply according to the solar insolation sensed by the solar insolation sensor, and since an adjustment/correction of the solar insolation value is not done based on a positional relationship between the sun and the one's vehicle, as well as locations of the outlets, for example, in the event that the positional relationship between the sun and the one's vehicle is such that the body of the driver is not subjected to the solar insolation while the solar insolation sensor is subjected to the solar insolation, an adjustment/correction of the solar insolation is done based on the solar insolation received by the solar insolation sensor.

Namely, according to the conventional control system for an automotive air conditioner, the solar insolation heat received by the driver does not necessarily coincide with an extent to which the air conditioner is controlled depending upon the location of the sun. For example, in the event that the temperature is set so that the driver can feel comfortable at the upper half portion of his or her body, there is caused an excessive amount of cold air to be applied to the lower half portion of the driver's body, or in a state in which sun light is applied to the driver's seat while the front-passenger seat is shaded from direct sun light, it becomes impossible to control the temperature of the driver/passenger compartment so that both the driver and the front-seat passenger can feel comfortable sufficiently.

SUMMARY OF THE INVENTION

The invention was made to solve the problem inherent in the prior art, and an object thereof is to provide a control system for an automotive air conditioner which is improved so as to increase further the comfortableness of the driver and passengers.

With a view to attaining the object, according to a first aspect of the invention, there is provided a control system for an automotive air conditioner wherein a target temperature for conditioned air discharged from outlets is calculated from a detection value of an in-vehicle temperature sensor (6), a detection value of an ambient temperature sensor (7) and preset temperatures (4, 5) and wherein the temperature for conditioned air discharged from outlets is corrected with a solar insolation correction coefficient based on a solar insolation detected by a solar insolation sensor (2). In the control system, the solar insolation correction coefficient comprises two types of values one of which is a value (11L, 11R) expressed by a directly body-transmitted solar insolation component which is a solar insolation directly received by the body of a driver and/or a passenger whereas the other is a value (12) expressed by a vehicle applied solar insolation component which is a solar insolation received by a vehicle to thereby increase the temperature of a driver/passenger compartment.

According to this configuration, the target temperature for conditioned air discharged from the outlets can be set in such a manner as to correspond to the solar insolation which the driver actually receives.

In addition, according to a second aspect of the invention, there is provided a control system for an automotive air conditioner wherein a target temperature for conditioned air discharged from outlets is calculated from a detection value of an in-vehicle temperature sensor, a detection value of an ambient temperature sensor and preset temperatures and wherein the temperature for conditioned air discharged from outlets is corrected with a solar insolation correction coefficient based on a solar insolation detected by a solar insolation sensor. In the control system according to the present invention, there are provided outlets disposed at upper and lower positions and selector member for selecting the upper and lower outlets, and in that the solar insolation correction coefficient for correcting the target temperature for conditioned air discharged from the upper and lower outlets comprises two first and second values.

According to this configuration, when the temperature is set so that the driver can feel comfortable at the upper half portion of the body thereof to which the solar insolation is applied, the temperature can be set so that the drive can also feel comfortable at the lower half portion of the body thereof to which no solar insolation is applied.

Additionally, according to a third aspect of the invention, there is provided a control system for an automotive air conditioner as set forth in the second aspect of the invention, wherein the target temperature for conditioned air discharged from the upper outlet is controlled by a total value of the two values whereas the temperature of conditioned air discharged from the lower outlet is controlled only by the second value. Furthermore, according to a fourth aspect of the invention, there is provided a control system for an automotive air conditioner as set forth in the second aspect of the invention, wherein there is provided selector member for allowing conditioned air to be discharged simultaneously from the upper and lower outlets, and wherein the temperature of conditioned air discharged from the upper outlet is controlled by the first value whereas the temperature of conditioned air discharged from the lower outlet is controlled by the second value. Moreover, according to a fifth aspect of the invention, there is provided a control system for an automotive air conditioner as set forth in any of the second to fourth aspects of the invention, wherein the first value is a value adapted to vary according to the location of the sun whereas the second value is a value which is constant in general irrespective of the orientation of the sun. Thus, according to the configurations as set forth in the second to fifth aspect of the invention, the temperatures of conditioned air discharged from the outlets into the driver/passenger compartment can be controlled in a more precise fashion so as to optimize the environment inside the driver/passenger compartment.

Furthermore, according to a sixth aspect of the invention, there is provided a control system for an automotive air conditioner wherein a target temperature for conditioned air discharged from outlets is calculated from a detection value of an in-vehicle temperature sensor, a detection value of an ambient temperature sensor and preset temperatures and wherein the temperature for conditioned air discharged from outlets is corrected with a solar insolation correction coefficient based on a solar insolation detected by a solar insolation sensor. In the control system according to the present invention, there are provided outlets disposed at upper left and right and lower left and right positions and temperature adjusting member for individually adjusting temperatures of conditioned air discharged, respectively, from the upper left and right and lower left and right outlets, and in that the temperatures of conditioned air discharged from the upper left and right outlets are controlled by left and right individual correction values which correspond to the location of the sun whereas the temperatures of conditioned air discharged from the lower left and right outlets are controlled by a value which is common to the conditioned air discharged from the lower left and right outlets irrespective of the orientation of the sun. According to this configuration, the temperatures of conditioned air discharged from the outlets of the air conditioner can be optimized in every condition.

The invention may be more fully understood from the description of preferred embodiments of the invention, as set forth below, together with the accompanying drawings.

DESCRIPTION OF THE PREFERRED EMBODIMENTS

The invention will be described in detail with reference to the accompanying drawings.

Figure 1:
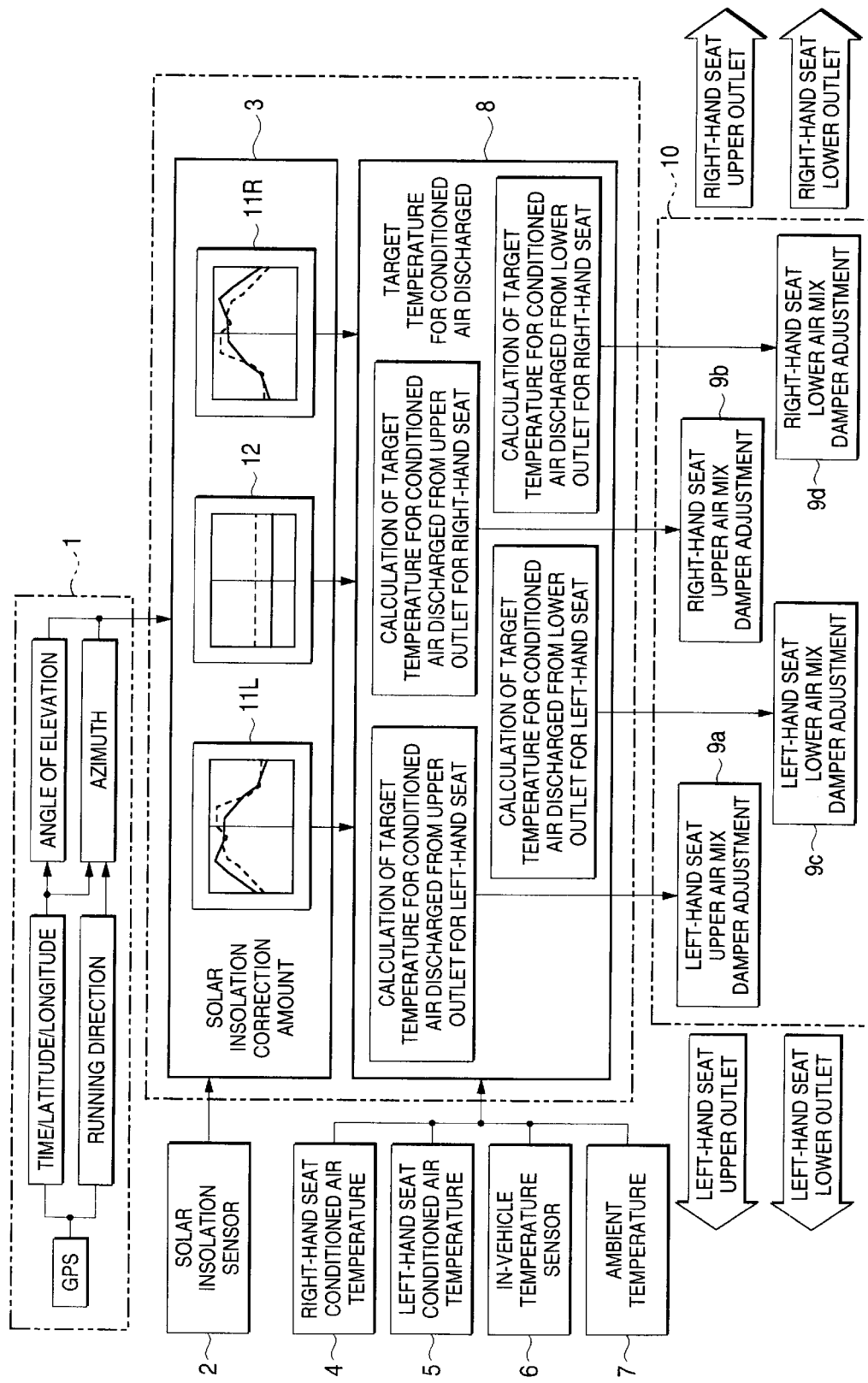
FIG. 1 is an overall block diagram of a control system according to an embodiment of the invention.

FIG. 1 is a block diagram of a control system for an air conditioner which is constructed based on the invention. The control system according to the invention comprises a GPS (Global Positioning System) 1, a solar insolation sensor 2, a solar insolation correction amount calculation member 3, a right-hand seat conditioned air temperature setting device 4, a left-hand side seat conditioned air temperature setting device 5, an in-vehicle temperature sensor 6, an ambient temperature sensor 7, and a temperature calculating member 8.

The solar insolation correction amount calculation member 3 corrects/adjusts the output from the solar insolation sensor 2 in accordance with a relationship between the one's vehicle and the position of the vehicle obtained by the GPS system. The temperature calculating member 8 calculates a target temperature for conditioned air discharged from outlets based on outputs from the solar insolation correction amount calculation member 3, the right-hand seat conditioned air temperature setting device 4, the left-hand side seat conditioned air temperature setting device 5, the in-vehicle temperature sensor 6 and the ambient temperature sensor 7.

The control system according to the invention further comprises a temperature adjusting member 9a to 9d that is constituted by air mix dampers for mixing cold air with hot air, whereby an outlet selector member 10 is controlled which is intended to appropriately select flows of conditioned air to outlets disposed at upper and lower positions for the right- and left-hand seats, respectively. In addition, since conventionally well-known mechanisms can be applied to the temperature adjusting member 9a to 9d and the outlet selector member 10, detailed description on the constructions of those members will be omitted.

Firstly, a positional relationship between the sun and one's vehicle at a current point in time or the direction and angle of elevation of the solar insolation relative to the center of the one's vehicle is grasped from the GPS system 1, and the correction of a detected value of the solar insolation sensor 2 is implemented based on the positional relationship between the sun and the one's vehicle so grasped.

Figure 2:
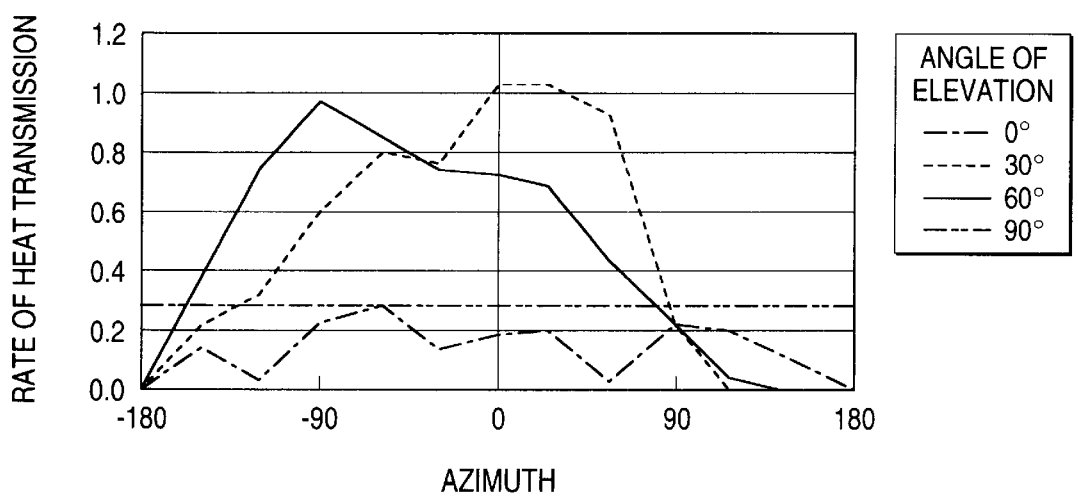
FIG. 2 is a graph showing characteristics of a directly body-transmitted solar insolation component.
Figure 3:
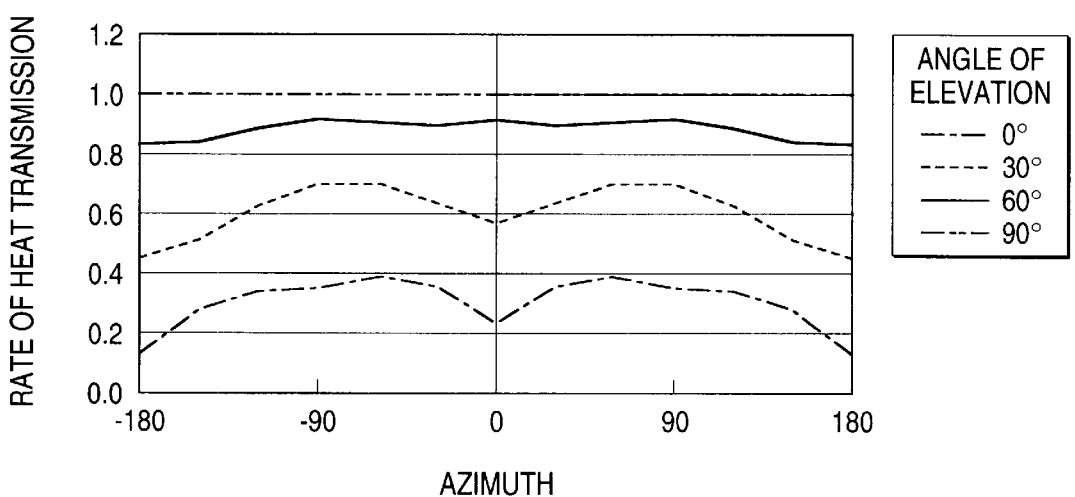
FIG. 3 is a graph showing characteristics of a vehicle applied solar insolation component.

Stored in the solar insolation correction amount calculation member 3 are directly body-transmitted solar insolation correction amount maps 11L, 11R for the right- and left-hand seats and a vehicle applied solar insolation correction amount map 12. These correction amount maps 11L, 11R, 12 correspond, respectively, to heat transmission properties diagrams shown in FIGS. 2 and 3, and the directly body-transmitted solar insolation correction amount maps for the left- and right-hand seats are symmetrical with each other. For example, as shown in FIG. 2, since the rate of heat transmission relative to the upper half portion of the body reaches its peak when the sun is at a high angle of elevation and is situated on the side of one's seat(for example, a driver seat side) and when the sun is at a low angle of elevation and is situated on an opposite side to the one's seat (i.e., a passenger seat side), as this occurs a correction amount for a standard value from the solar insolation sensor 2 is made larger. On the other hand, since the vehicle applied solar insolation correction amount map 12 is influenced little by the azimuth as is shown in FIG. 3 and the higher the sun is situated the higher the temperature in the driver/passenger compartment tends to be increased by the total heat which has entered through the window glass, the correction amount is designed to be set based only on the angle of elevation.

Target temperatures for conditioned air discharged, respectively, from the upper and lower outlets for the left- and right-hand seats are calculated based on these correction values, and the temperature adjusting member 9a to 9d for the respective outlets are controlled individually.

Basic target temperature values for conditioned air discharged from the upper and lower outlets are expressed by the following expressions.

$$Taovnt=F(Tam, Tset, Tr)-(K1+K2) \times Tsun$$

$$Taoft=F(Tam, Tset, Tr)-K2 \times Tsun$$

where, Taonvt is a target temperature for conditioned air discharged from the upper outlet, Taoft is a target temperature for conditioned air discharged from the lower outlet, Tam is the temperature of the ambient temperature sensor, Tset is a set temperature, Tr is the temperature of the in-vehicle temperature sensor, K1 is a directly body-transmitted solar insolation correction coefficient, K2 is a vehicle applied solar insolation correction coefficient, and Tsun is an output from the solar insolation sensor.

In an air conditioner in which the selection of the upper and lower outlets is designed to be implemented by the outlet selector member 10, the temperature of conditioned air discharged from the upper outlet is controlled by the total value (K1+K2) of the directly body-transmitted solar insolation correction coefficient (K1) and the vehicle applied solar insolation correction coefficient (K2), whereas the temperature of conditioned air discharged from the lower outlet is controlled only by the vehicle applied solar insolation correction coefficient (K2), whereby a further optimization of the temperature in the driver/passenger compartment according to the location of the sun can be realized.

In addition, in an air conditioner in which the temperatures of conditioned air discharged from the upper and lower outlets can be controlled individually independently, in the event that conditioned air is discharged simultaneously from the upper and lower outlets (a bi-level mode), the temperature of conditioned air discharged from the upper outlet may be controlled only by the directly body-transmitted solar insolation correction coefficient (K1) whereas the temperature of conditioned air discharged from the lower outlet may be controlled only by the vehicle applied solar insolation correction coefficient (K2).

Furthermore, in an air conditioner in which the temperatures of conditioned air discharged, respectively, from the upper left and right outlets and lower left and right outlets can be controlled individually independently, the temperatures of conditioned air discharged from the upper left and right outlets may be controlled according to the location (azimuth and angle of elevation) of the sun using individually the left and right different directly body-transmitted solar insolation coefficients whereas the temperatures of conditioned air discharged from the lower left and right outlets may be controlled using the vehicle applied solar insolation correction coefficient which is common to conditioned air discharged from both the left and right outlets (using a constant value which has nothing to do with the azimuth of the sun independently for the left and right outlets).

Figure 4:
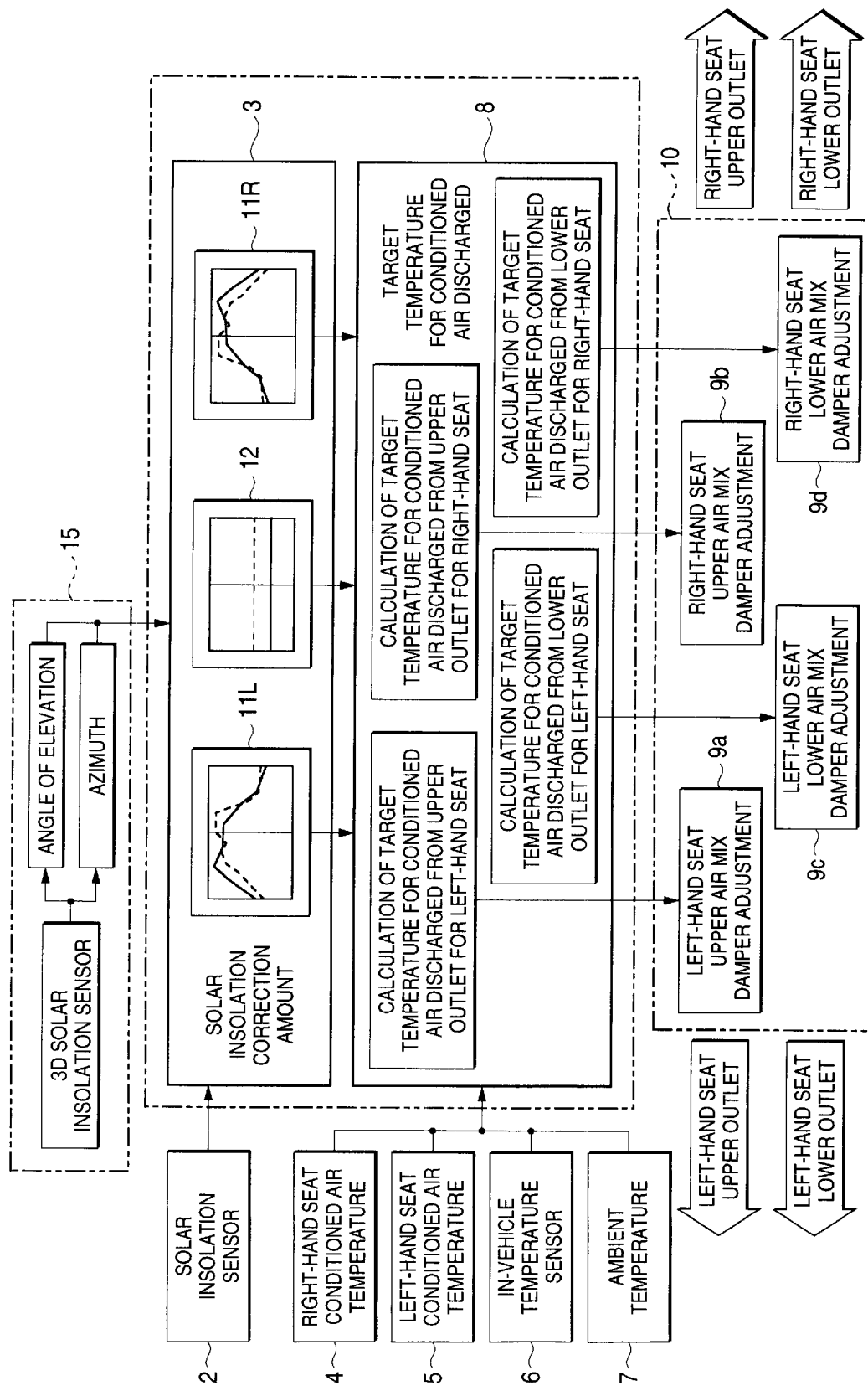
FIG. 4 is an overall block diagram of a control system according to another embodiment of the invention.
Figure 5:
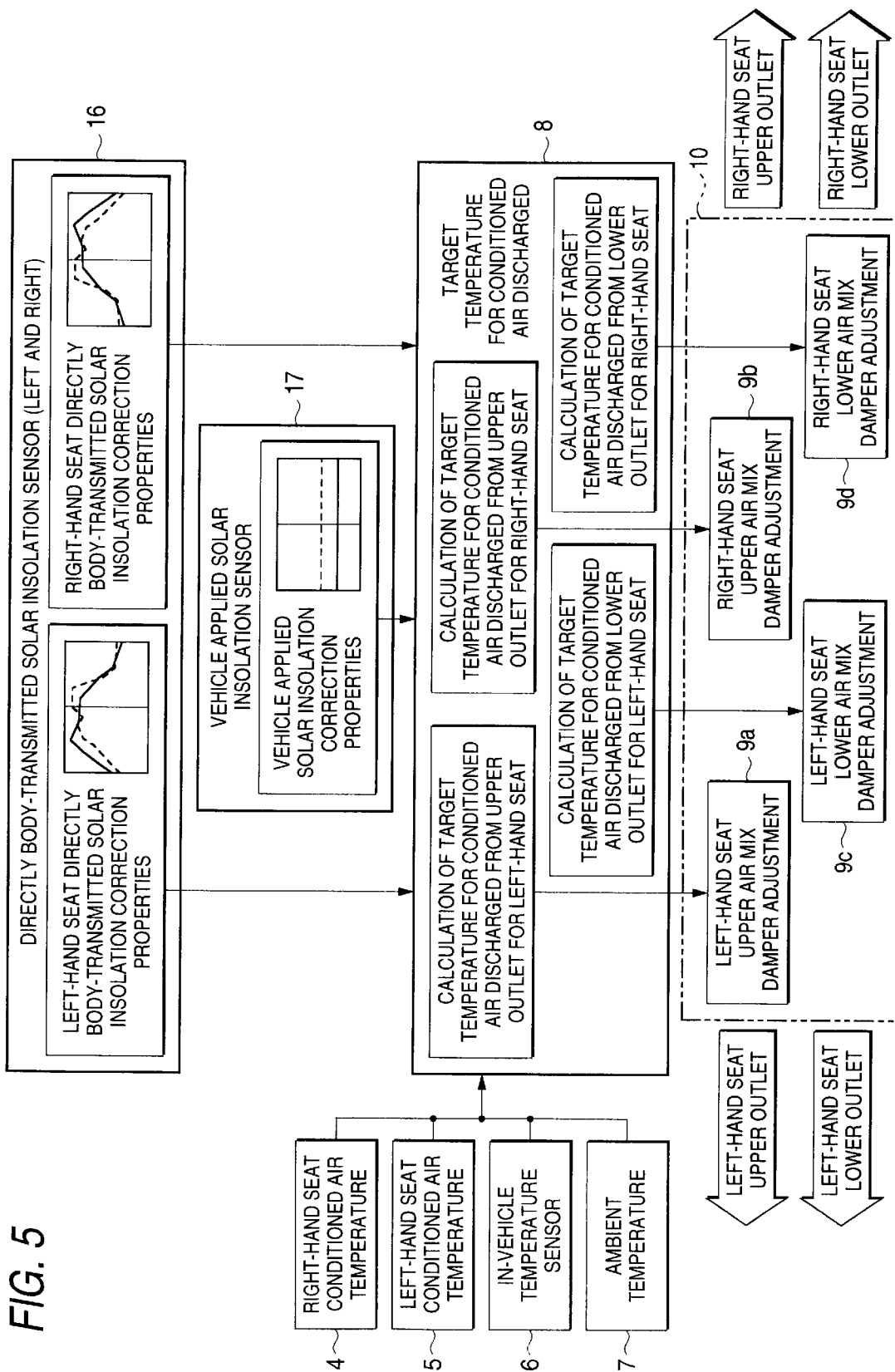
FIG. 5 is an overall block diagram of a control system according to a further embodiment of the invention.

In addition, in the invention, a 3D solar insolation sensor 15 for directly outputting information on the azimuth and angle of elevation of the solar insolation may be used instead of the information on azimuth and angle of elevation of the solar insolation obtained from the GPS system 1 (refer to FIG. 4). Alternatively, solar insolation sensors 16, 17 may be used which are designed to have a directivity which allows the acquisition of outputs corrected according to the azimuth and angle of elevation of the solar insolation (refer to FIG. 5).

As has been described in detail heretofore, according to the invention, the two types of solar insolation correction coefficients are prepared one of which is the directly body-transmitted solar insolation coefficient for use in correcting the solar insolation component which is directly applied or transmitted to the body and the other is the vehicle applied solar insolation correction coefficient for use in correcting the solar insolation component which functions to increase the temperature in the driver/passenger compartment, so that different solar insolation corrections are carried out for a case where the solar insolation is directly applied to the driver and a case where the driver is shadowed from the solar insolation by the vehicle itself. Thus, with the control system for an automotive air conditioner according to the invention, it is possible to optimize the temperature of conditioned air discharged from the outlets of the air conditioner in every condition, whereby a tremendous advantage can be provided in making the environment in the driver/passenger compartment of the vehicle more comfortable.

In particular, in the event that the solar insolation is directly applied to the driver whereby the upper half portion of his or her body gets excessively hot, the solar insolation correction is carried out by the directly body-transmitted solar insolation correction coefficient for the temperature of conditioned air discharged from the upper outlet whereas the solar insolation correction is carried out by the vehicle applied solar insolation correction coefficient for the temperature of conditioned air discharged from the lower outlet for the lower half portion of the body to which the solar insolation is difficult to be applied directly, thereby making it possible to adjust suitably the temperature of conditioned air discharged to both the upper and lower half portions of the body.

While the invention has been described by reference to the specific embodiments chosen for the purpose of illustration, it should be apparent that numerous modifications could be made thereto by those skilled in the art without departing from the sprit and scope of the invention.

What is claimed is:

1. A control system for an automotive air conditioner comprising:

an in-vehicle temperature sensor;

an ambient temperature sensor;

a controller for calculating a target temperature for conditioned air discharged from outlets in accordance with a preset temperature, a detection value of the in-vehicle temperature sensor and a detection value of the ambient temperature sensor; and a solar insolation sensor, wherein the temperature for the conditioned air is corrected with a solar insolation correction coefficient based on a solar insolation detected by the solar insolation sensor, and wherein said solar insolation correction coefficient includes, a first value expressed by a body solar insolation component which is a solar insolation directly received by one's body in a vehicle, and a second value expressed by a vehicle solar insolation component which is a solar insolation received by the vehicle to thereby cause to an increase of the in-vehicle temperature.

2. The control system according to claim 1, wherein the solar insolation correction coefficient based on the solar insolation detected by the solar insolation sensor is changed in accordance with information obtained by GPS.

3. The control system according to claim 2, wherein the information comprises a direction and an angle of elevation of the solar insolation relative to the center of the vehicle.

4. A control system for an automotive air conditioner, comprising:

an in-vehicle temperature sensor;

an ambient temperature sensor;

a controller for calculating a target temperature for conditioned air discharged from at least one of first and second outlets in accordance with a preset temperature, a detection value of the in-vehicle temperature sensor and a detection value of the ambient temperature sensor;

a selector member for selecting the first and second outlets; and a solar insolation sensor, wherein said temperature for conditioned air discharged from outlets is corrected with a solar insolation correction coefficient based on a solar insolation detected by the solar insolation sensor, wherein said solar insolation correction coefficient for correcting said target temperature for conditioned air discharged from said first and second outlets comprises first and second values.

5. The control system according to claim 4, wherein said first outlet is an upper outlet, and said second outlet is a lower outlet.

6. The control system according to claim 5, wherein the target temperature of conditioned air discharged from said upper outlet is controlled by a total value of said first and second values, whereas the target temperature of conditioned air discharged from said lower outlet is controlled only by said second value.

7. The control system according to claim 5, wherein the selector member allows conditioned air to be discharged simultaneously from said upper and lower outlets, and wherein the temperature of conditioned air discharged from said upper outlet is controlled by said first value, whereas the temperature of conditioned air discharged from said lower outlet is controlled by said second value.

8. The control system according to claim 5, wherein said first value is a value adapted to vary according to a location of the sun, whereas said second value is a value which is substantially constant irrespective of an orientation of the sun.

9. The control system according to claim 6, wherein said first value is a value adapted to vary according to a location of the sun, whereas said second value is a value which is substantially constant irrespective of an orientation of the sun.

10. The control system according to claim 7, wherein said first value is a value adapted to vary according to a location of the sun, whereas said second value is a value which is substantially constant irrespective of an orientation of the sun.

11. The control system according to claim 4, wherein the solar insolation correction coefficient based on the solar insolation detected by the solar insolation sensor is changed in accordance with information obtained by GPS.

12. The control system according to claim 4, wherein the solar insolation correction coefficient based on the solar insolation detected by the solar insolation sensor is changed in accordance with information obtained by a 3D solar insolation sensor that can output information on the azimuth and angle of elevation of the solar insolation.

13. A control system for an automotive air conditioner comprising:

an in-vehicle temperature sensor;

an ambient temperature sensor;

a controller for calculating a target temperature for conditioned air discharged from at least one of an upper right outlet, a lower right outlet, an upper left outlet and a lower left outlet in accordance with the detection value of the in-vehicle temperature sensor and the detection value of the ambient temperature sensor;

a selector member for selecting at least one of the upper right, lower right, upper left and lower left outlets;

a solar insolation sensor; and temperature adjusting member for individually adjusting temperatures of conditioned air discharged, respectively, from said upper left and right and lower left and right outlets, wherein the temperatures of conditioned air discharged from said upper left and right outlets are controlled by left and right individual correction values which correspond to a location of the sun, whereas the temperatures of conditioned air discharged from said lower left and right outlets are controlled by a value which is common to said conditioned air discharged from said lower left and right outlets irrespective of an orientation of the sun.

14. The control system according to claim 13, wherein the solar insolation sensor comprises:

a left solar insolation sensor for detecting a body solar insolation component which is directly received by one's body seated on the left side of in a vehicle, a right solar insolation sensor for detecting a body solar insolation component which is directly received by one's body seated on the right side of in the vehicle, and a solar insolation sensing member for detecting a vehicle solar insolation component which is a solar insolation received by the vehicle to thereby cause to an increase of the in-vehicle temperature.

* * * * *